(12) United States Patent
Annamalai

(10) Patent No.: US 10,511,930 B2
(45) Date of Patent: Dec. 17, 2019

(54) REAL-TIME LOCATION SMART SPEAKER NOTIFICATION SYSTEM

(71) Applicant: CenTrak, Inc., Newtown, PA (US)

(72) Inventor: Karuppiah Annamalai, Newtown, PA (US)

(73) Assignee: CenTrak, Inc., Newtown, PA (US)

(*) Notice: Subject to any disclaimer, the term of this patent is extended or adjusted under 35 U.S.C. 154(b) by 0 days.

(21) Appl. No.: 15/912,302

(22) Filed: Mar. 5, 2018

(65) Prior Publication Data

US 2019/0274003 A1 Sep. 5, 2019

(51) Int. Cl.
*H04W 4/02* (2018.01)
*H04L 29/06* (2006.01)
*G01S 5/14* (2006.01)
*G01S 5/22* (2006.01)
*H04B 10/114* (2013.01)

(52) U.S. Cl.
CPC ............. *H04W 4/02* (2013.01); *H04L 65/40* (2013.01); *G01S 5/14* (2013.01); *G01S 5/22* (2013.01); *H04B 10/1149* (2013.01)

(58) Field of Classification Search
CPC ......... H04H 40/00; H04H 60/52; H04W 4/02; H04L 65/40
See application file for complete search history.

(56) References Cited

U.S. PATENT DOCUMENTS

| | | | |
|---|---|---|---|
| 7,522,049 B2 | 4/2009 | Aljadeff et al. | |
| 8,139,945 B1 | 3/2012 | Amir et al. | |
| 8,604,909 B1 | 12/2013 | Amir et al. | |
| 9,507,915 B2 | 11/2016 | Zhang et al. | |
| 9,679,171 B2 | 6/2017 | Bhargava et al. | |
| 9,838,849 B2 | 12/2017 | Kusens | |
| 9,860,688 B2 | 1/2018 | Kulkarni et al. | |
| 9,872,151 B1 | 1/2018 | Puzanov et al. | |
| 10,051,107 B1* | 8/2018 | Prasad | H04M 1/72566 |
| 2003/0067392 A1* | 4/2003 | Monroe | G08B 21/0269 340/573.1 |
| 2013/0052940 A1* | 2/2013 | Brillhart | H04H 40/00 455/3.06 |
| 2015/0249718 A1* | 9/2015 | Huybregts | G06K 9/00228 709/202 |
| 2017/0086004 A1* | 3/2017 | Downing | G06F 3/165 |

* cited by examiner

*Primary Examiner* — Nabil H Syed
(74) *Attorney, Agent, or Firm* — Kaplan Breyer Schwarz, LLP

(57) ABSTRACT

A system and methods for presenting a notification for playback at a smart speaker device including a real-time location (RTL) server, a portable device configured to transmit an output signal including a portable device ID representative of the portable device to the RTL server, a notification server configured to communicate with the RTL server, where the notification server is configured to associate the notification with the portable device ID, and at least one of generate, store, distribute, cue and present for playback the notification based on the portable device ID on the smart speaker device associated with a location. The RTL server is configured to determine the location and an identity of the portable device based on receiving the output signal including the portable device ID, and the notification server is configured to cue the associated notification for playback at the smart speaker device based on the determined location of the portable device.

25 Claims, 5 Drawing Sheets

REAL-TIME LOCATION SMART SPEAKER NOTIFICATION SYSTEM

FIELD OF THE INVENTION

The present invention relates to methods and systems for locating and identifying portable devices in an enclosure and then identifying notifications to be sent to smart speaker devices for playback at the particular identified enclosures associated with the particular identified portable devices.

BACKGROUND OF THE INVENTION

Real-time location (RTL) systems have become popular in recent years. Examples of RTL systems are taught in U.S. Pat. Nos. 7,522,049, 9,507,915, 9,679,171, 9,838,849 and 9,872,151.

In such prior art RTL systems, the location of an object is usually determined in one of two ways.

First, the system may have a portable device, associated with an asset to be tracked, transmit an RF or other wireless type of signal to multiple receivers. Each receiver measures the signal strength of received signal. The system then equates each received signal strength to a calibrated distance and uses triangulation of those distances to calculate a location of the portable device.

Second, systems exist in which a plurality of base stations, mounted at fixed locations in a facility, transmit base station ID information using ultrasound or infrared signaling. The base station IDs are received at portable tags attached to assets to be tracked. When the portable tag receives the base station ID, it concatenates its own portable tag ID to the base station ID and transmits both IDs to a network server. The server may then determine a location by associating the asset to which the portable tag is attached with the predetermined location of the base station associated with the transmitted base station ID.

While both types of RTL systems are sufficient to locate assets, they do not make full use of what can be done with the knowledge of the location of such assets.

SUMMARY

It should be appreciated that this Summary is provided to introduce a selection of concepts in a simplified form that are further described below in the Detailed Description. This Summary is not intended to be used to limit the scope of the claimed subject matter.

In one embodiment disclosed herein, a system that presents a notification for playback at a smart speaker device includes a real-time location (RTL) server configured to communicate with a backbone network, a portable device configured to transmit an output signal including a portable device ID representative of the portable device to the RTL server via the backbone network, a notification server configured to communicate with the backbone network and the RTL server, the notification server configured to associate the notification with the portable device ID, and at least one of generate, store, distribute, cue and present for playback the notification based on the portable device ID, and a smart speaker device configured to receive communication from the notification server via the backbone network, the smart speaker device is associated with a location. The RTL server is configured to determine the location and an identity of the portable device based on receiving the output signal including the portable device ID, and the notification server is configured to cue the associated notification for playback at the smart speaker device based on the determined location of the portable device.

In another embodiment disclosed herein, a method transmits a notification to a smart speaker device based on identifying a portable device ID and a portable device location of a portable device. The method includes determining, at an RTL server, a location and an identity of the portable device based on receiving an output signal from the portable device at the RTL server, associating, at a notification server, a notification corresponding to the portable device based on the determined identity of the portable device, determining, at the notification server, a notification playback location corresponding to the determined location of the portable device, and thereafter cueing for playback the associated notification at the smart speaker device proximate the notification playback location.

In another embodiment disclosed herein, a method transmits a notification to a smart speaker device based on identifying a portable device ID and a portable device location of a portable device. The method includes determining, at an RTL server, a location and an identity of each of a plurality of portable devices based on receiving output signals from the plurality of portable devices, associating, at a notification server, a notification corresponding to at least one of the plurality of portable devices based on the determined identity of the at least one of the plurality of portable devices, determining, at the notification server, a notification playback location corresponding to the determined location of the plurality of portable devices, and thereafter cueing for playback the associated notification at the smart speaker device proximate the determined notification playback location.

BRIEF DESCRIPTION OF THE SEVERAL VIEWS OF THE DRAWINGS

The embodiments of the invention will be better understood from the following detailed description with reference to the drawings, which are not necessarily drawing to scale and in which.

DETAILED DESCRIPTION

Figure 1:
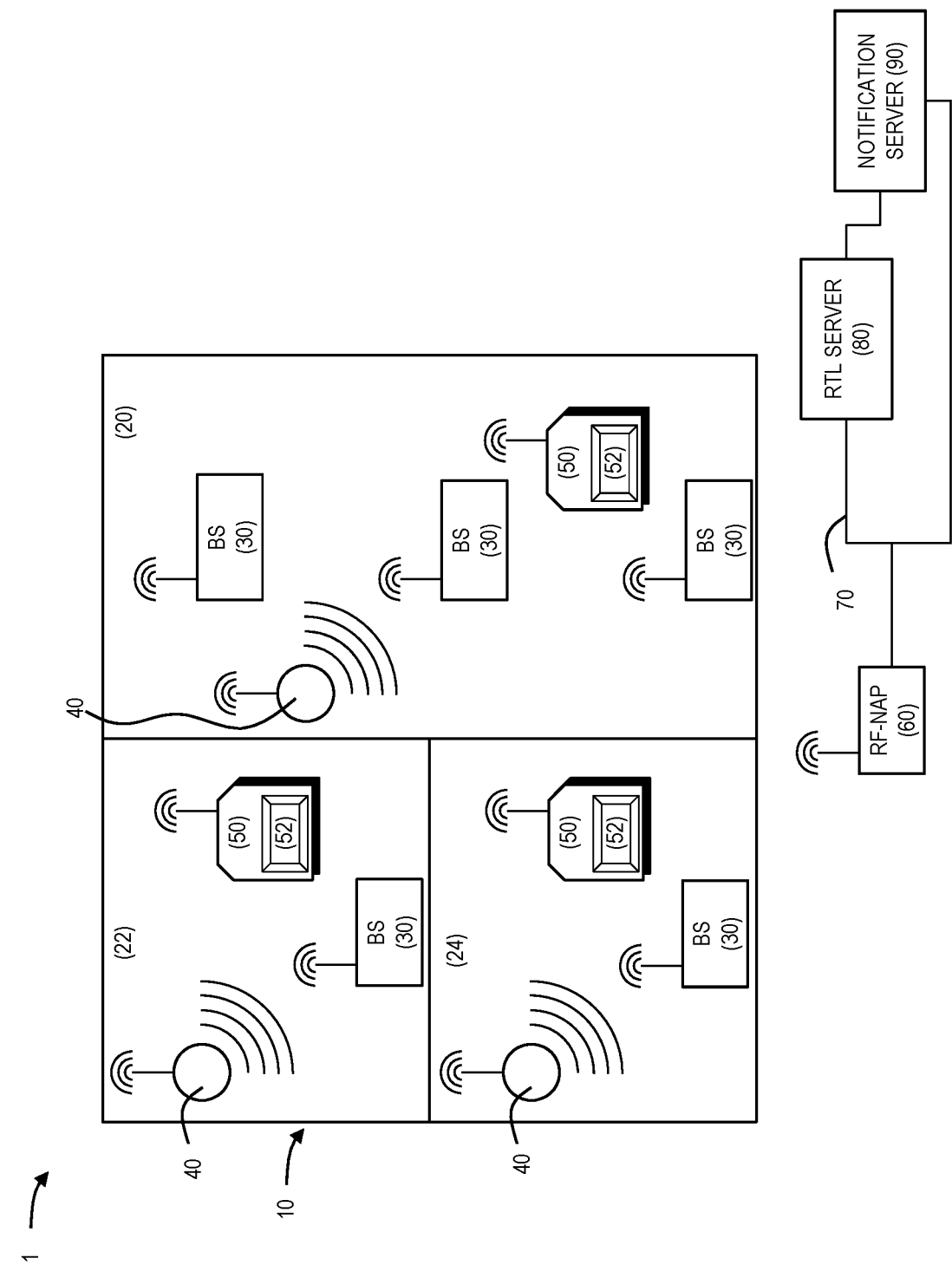
FIG. 1 illustrates a schematic diagram of a system for locating and identifying portable devices in an enclosure, according to an embodiment of the present invention.

A system and method for driving smart speaker device with notifications is disclosed in which the notifications are based upon location determination of one or more assets by an RTL system.

For example, in a hospital environment, a notification may be sent to a particular smart speaker to alert a patient to take medication if the RTL system determines that the patient is in a particular location. Or, a message for a patient may be conveyed through the smart speaker only if the RTL system determines that the patient is in that location and that others are not in the location, in order to ensure confidentiality.

More generally, the location of one or more portable tags is used to determine a message to be sent to a particular smart speaker, thereby integrating the RTL system capabilities with a smart speaker system.

Generally, a notification system is a system that generates and/or accumulates different types of notifications to be sent to various devices of a user. These systems may automatically generate notification based on predetermined configurations of an employer or site installation, and/or they may allow individual users to generate and/or forward notifications to the notification server to be managed by the notification server at the notification server site installation. Notifications may be electronic text, email, SMS messaging, audio files, and video files distributed by various types of wired and wireless networks to users via portable user devices, computer stations, electronic message boards, public address systems, video monitors, and the like.

A smart speaker is a type of wireless speaker and voice command device with an integrated virtual assistant (artificial intelligence) that offers interactive actions and handsfree activation with the help of a "hot word" (or several "hot words"). Some smart speakers can also act as a smart device that utilizes Wi-Fi, Bluetooth and other wireless RF protocol standards to extend usage beyond audio playback, such as to control home automation devices. This can include, but is not be limited to, features such as compatibility across a number of services and platforms, peer-to-peer connection through mesh networking, intelligent personal assistants, and others. Each can have its own designated interface and features in-house, usually launched or controlled via application or home automation software. Some smart speakers also include a screen or display to show the user a visual or numeric response.

As set forth in more detail below, an exemplary embodiment of the invention relates to using the RTL system to determine location of an asset or person and providing a notification server integrated with the RTL system to create a real-time location notification (RTLN) system. Notifications can then be selectively transmitted, audibly for example, based upon the location of a person to whom the notification is addressed, and based upon the location of one or more other personnel or assets, the locations of which are available to the RTL system and hence, which may be used to drive the notification server.

Referring now to FIG. 1, a block diagram of one embodiment of a RTLN system 1 is illustrated for determining a location and an identity of portable devices 50 in an enclosure 52 and cues a notification for playback at a smart speaker 40 in the enclosure 52, the notification corresponding to a particular identity of one of the portable devices 50. RTLN system 1 may include a plurality of base stations (BS) 30, one or more portable devices 50, a plurality of smart speaker devices 40, and at least one RF-network access point (RF-NAP) 60. The RF-NAP 60 may communicate via a backbone network 70 to a real-time location (RTL) server 80 and a notification server 90.

The enclosure 52 may include a plurality of separate zones 70, which typically coincide with individual rooms or zones within the enclosure 52. For example, one zone 70 may represent a corridor. Each room or zone may be provided with at least one base station 30. For example, corridor 20 may include three base stations 30, whereas rooms 22 and 24 may include only one base station 30 each.

As taught by U.S. Pat. Nos. 8,604,909 and 8,139,945, such RTL systems may be used to locate one or more assets. It is noted that while the two aforementioned patents are used as examples herein, but the present invention is applicable to, and may use, any one or more RTL systems based upon a variety of technologies, examples of which can be found, for example, in the above-mentioned U.S. Pat. Nos. 7,522,049, 9,507,915, 9,679,171, 9,838,849 and 9,872,151.

Figure 2:
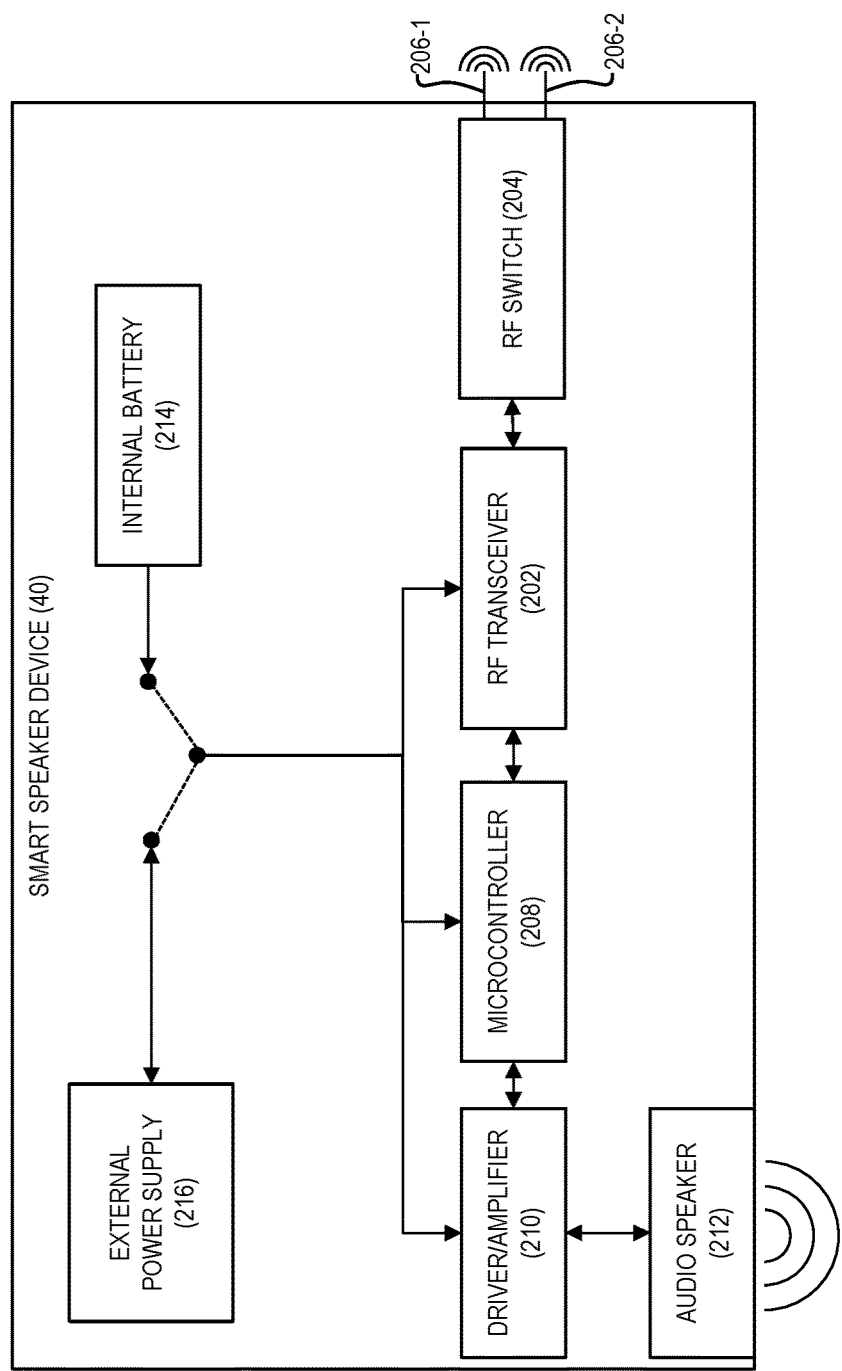
FIG. 2 illustrates a schematic diagram of a smart speaker device, according to an embodiment of the present invention.

Referring now to FIG. 2, block diagram of smart speaker 40 is shown. Smart speaker 40 includes an RF transceiver 202, RF switch 204, antennae 206-1, 206-2, microcontroller 208, driver/amplifier 210 and audio speaker 212. Smart speaker 40 may be powered by internal battery 214 or by an external power supply 216. RF transceiver 202 may be configured to receive RF transmissions, for example, notification package signal from RF-NAP 60 (FIG. 1) via antenna 206-1 or 206-2.

Figure 3:
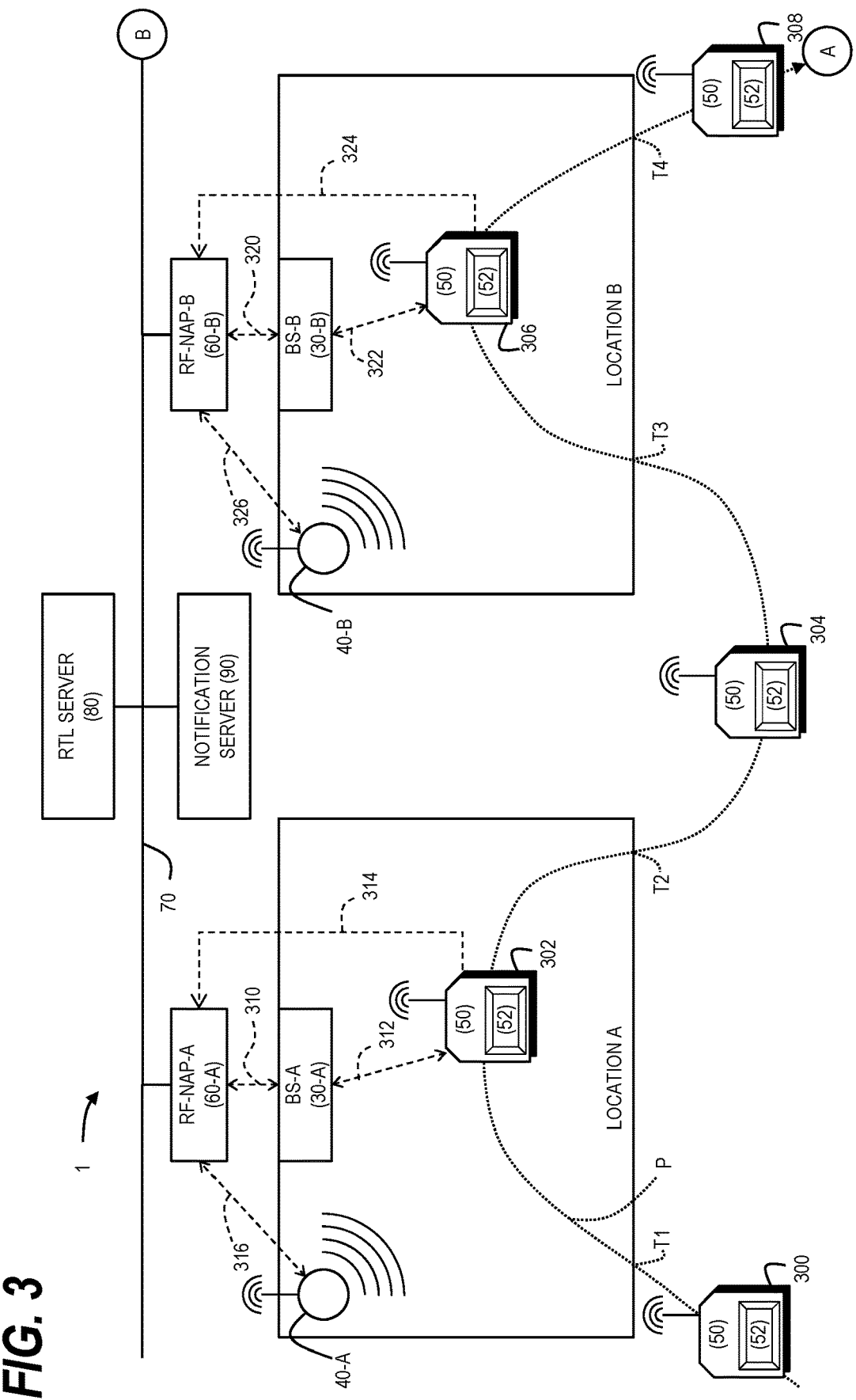
FIG. 3 illustrates a schematic diagram of a system for locating and identifying portable devices using multiple subnets, according to another embodiment of the present invention.
Figure 4:
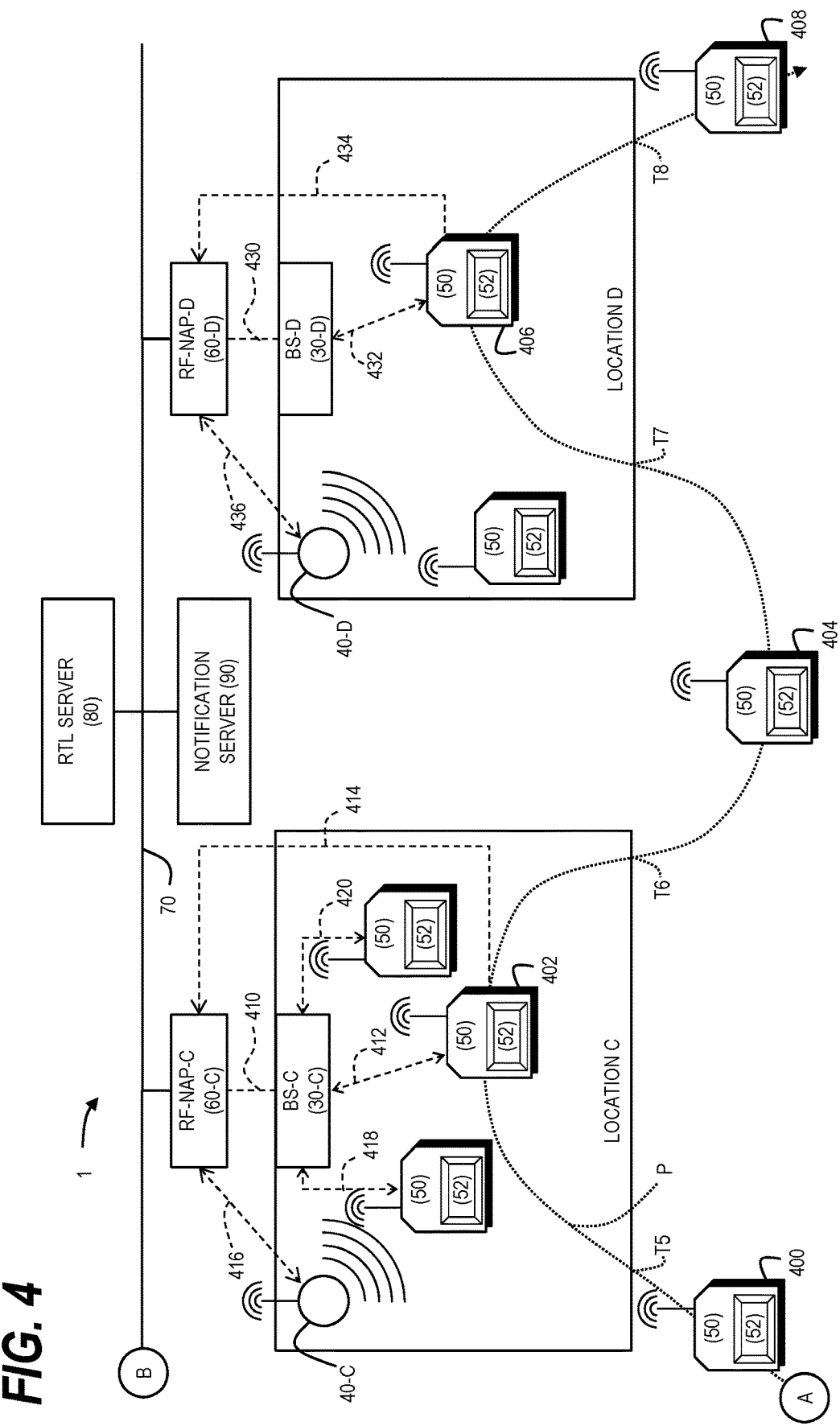
FIG. 4 illustrates a schematic diagram of one embodiment of the system for locating and identifying portable devices and presented for playback notifications at a smart speaker device at the located enclosure of the portable device.

FIGS. 3-4 illustrates one embodiment of the RTLN system 1 illustrated in FIG. 1, where FIG. 3 represents Location A and Location B, and FIG. 4 represents Location C and Location D joined by the backbone network 70 to communication with RTL server 80 and notification server 90. FIGS. 3-4 show the integration of an RTL system with a notification server 90. Note that RTL server 80 and notification server 90 may, in one embodiment, be the same server singly performing the respective features associated with each separately identified server herein. For explanation purposes herein, the RTLN system 1 as illustrated in FIGS. 3-4 is presumed to incorporate an RTL system of the type described in U.S. Pat. No. 8,604,909, in which a plurality of fixedly mounted base stations transmit base station IDs, which are received by portable tags, and in which the portable tag retransmit the base station IDs with its own portable device ID for use in determining location by the RTL server 80. However, any such RTL system may be used, such as those described in U.S. Pat. No. 9,860,688 where a location of a wireless transponder is determined from measuring a relative signal strength from multiple receivers and performing a triangulation calculation to determine the location using each of the received relative signal strength indicators (RSSI) from the multiple receivers.

FIG. 3 illustrates one embodiment of the RTLN system 1 of FIG. 1 that includes Location A having a first RF network access point (RF-NAP-A) 60-A in communication 310 with a base station (BS-A) 30-A associated and located in Location A. Location A additionally has a smart speaker device 40-A in communication 316 with the RF-NAP-A 60-A to provide two-way communication with the notification server 90. In an alternative embodiment, smart speaker device 40-A may communicate via RF through the base station 30-A, (not shown), to the notification server 90 via the RF-NAP-A 60-A and the backbone network 70.

FIG. 3 further illustrates a representative path P which a portable device 50 having an actuation button 52 moves into and out of Locations A and B. For example, at position 300, the portable device 50 has yet to enter Location A and is may be out of reception range of transmission signals of BS-A 30-A. At time T1, portable device 50 enters Location A, and at or around position 302, the portable device 50 may communicate 312 with BS-A to receive an identifier of BS-A 30-A and combine it with its own portable device ID to communicate the combined ID information to the RTL server 80. The communication may take place via the BS-A 30-A 312 or directly 314 to the RF-NAP-A 60-A which then forwards the combined ID information via the backbone network 70 to the RTL server 80. In an alternative embodiment, the portable device may send a signal to multiple base stations to determine a relative signal strength indicators (RSSI) based on its position with respect to each base station wherein a real-time location server may determine the location of the portable device based on a triangulation of the RSSI.

RTL server 80 determines the received BS-ID of BS-A 30-A being Location A from a predetermined table identifying base stations 30 with their respective locations, and then associates the portable device ID of portable device 50 with Location A. RTL server 80 forwards the associated portable device ID of portable device 50 with Location A to the notification server 90 which then determines if there are any notifications associated with the portable device ID of portable device 50. When the notification server 90 determines at least one a notification is associated with the identified portable device 50, that notification is then examined to determine what type of a notification it is.

If the type of notification is determined to be played back immediately, then that notification is immediately sent from the notification server 90 via the backbone network 70 and RF-NAP-A to the smart speaker device 40 for playback. Another determined type of notification, (discussed in more detail below), may cause the notification server to cue the notification for subsequent transmission and playback at the smart speaker device 40 in the determined Location A based upon other conditions described below.

At time T2, portable device 50 exits Location A, wherein RTL server 80 may communicate to the notification server 90 that portable device 50 is no longer in Location A when the portable device 50 fails to provide any response to the RTL server 80. Notification server 90 may sends a signal to the smart speaker device 40 at the last known location of the portable device 50, e.g., Location A, to stop any notification being played back that is associated with portable device 50, and to record a timing location of where the notification was stopped or interrupted for playback. This timing location information allows the notification server 90 to resume playback of the notification when the RTL server 80 determines the portable device 50 is in another location with a corresponding smart speaker device 40.

FIG. 3 further illustrates Location B having a second RF network access point (RF-NAP-B) 60-B in communication 320 with a base station (BS-B) 30-B located in the Location B. Location B additionally has a smart speaker device 40-B in communication 326 with the RF-NAP-B 60-B to provide two-way communication with the notification server 90. In an alternative embodiment, smart speaker device 40-B may communicate via RF through the base station BS-B, (not shown), to the notification server 90 via the RF-NAP-B 60-B and the backbone network 70.

FIG. 3 further illustrates the portable device at time T3 entering Location B and at or around position 306 the portable device 50 may communicate 322 with BS-B 30-B. Portable device 50 then combines the BS-ID of BS-B 30-B with its own portable device ID and communicates the combined ID information to the RTL server 80 either with the BS-B 30-B at 322 or directly 324 to the RF-NAP-A 60-B which then forwards the combined ID information via backbone network 70 to the RTL server 80.

RTL server 80 determines the received BS-ID of BS-B 30-B being associated with Location B from a predetermined table identifying base stations with their respective locations, and then associates portable device ID of portable device 50 with Location B. RTL server 80 forwards the associated portable device ID of portable device 50 with Location B to the notification server 90 which then determines if there are any pending notifications associated with the portable device ID of portable device 50.

In this example, the notification server 90 determines that the playback of a notification was stopped or paused on the smart speaker device 40 in Location A as a result of the portable device 50 determined by the RTL server to have left Location A. When the notification server 90 receives the new and updated location of the portable device 50 from the RTL server 80, the notification server 90 examines the type of notification of the interrupted notification to determine if the notification is to be played back immediately cued for playback according to a certain condition.

In the embodiment where the notification was played back in Location A and then paused, the playback of the notification may be resumed in Location B either automatically when the RTL server 80 determines the updated location of the portable device 50, or upon manual activation of the actuation button 52 by a user on the portable device 50

In an alternative embodiment, the notification type may be determined to be a "reminder" type notification. A first example of a reminder-type notification may be presented when the portable device 50 is determined to enter or determined to already be in a location (e.g., Location B), where a smart speaker 40 exists. The notification server 90 then determines that a reminder-type notification is associated with a particular scheduled event and transmits the reminder-type notification to the smart speaker 40 for playback corresponding to at time associated with the scheduled event. For example, a patient with a portable device may have a reminder-type notification played back at a smart speaker device reminding them to take a scheduled medication at a particular time.

In an alternative embodiment, a reminder-type notification may be presented for playback when the portable device 50 is determined to enter a location, (e.g., Location B), having a scheduled event additionally associated with that particular location. In this example, a patient may be reminded at a smart speaker 40 located near or in a cafeteria or dining hall, (for example, Location B), to take a particular scheduled medication with food to be eaten in the cafeteria or dining hall.

At time T4, portable device 50 exists Location B and at position 308 may be out of communication range of any RF device to communicate with the RTL server 80. Thereafter, notification server 90 may sends a signal to the smart speaker device 40-B of the last known location of the portable device 50 to stop any notification being played back associated with portable device 50 and record a timing location of where the notification was stopped or interrupted for playback.

FIG. 4 further illustrates Location C having a third RF network access point (RF-NAP-C) 60-C in communication 412 with a base station (BS-C) 30-C located in Location C. Location C additionally has a smart speaker device 40-C in communication 416 with the RF-NAP-C 60-C to provide two-way communication with the notification server 90. In an alternative embodiment, smart speaker device 40-C may communication via RF through the base station BS-C, (not shown), to the notification server 90 via the RF-NAP-C 60-C and the backbone network 70.

FIG. 4 further illustrates the representative path P which the portable device 50 having the actuation button 52 moves into and out of Locations C and D. At position 400, the portable device 50 has yet to enter Location C and may be out of reception range of transmission signals of BS-C 30-C. At time T5, portable device 50 enters Location C and, at or around position 402, the portable device 50 communicates 412 with BS-C 30-C to receive the BS-ID of BS-C 30-C. Portable device 50 then combines the BS-ID of BS-C 30-C with its own portable device ID and communicates the combined ID information to the RTL server 80 either with the BS-C 30-C at 412 or directly 414 to the RF-NAP-A 60-A which then forwards the combined ID information via the backbone network 70 to the RTL server 80. As mentioned above, an alternative embodiment may use relative signal strength indicators (RSSI) to determine the location of the portable device from a plurality of receiver devices.

RTL server 80 determines the received BS-ID of BS-C 30-C being Location C from the predetermined table identifying base stations with their respective locations, and then associates portable device ID of portable device 50 with Location C. RTL server 80 forwards the associated portable device ID of portable device 50 with Location C to the notification server 90 which then determines if there are any pending notifications associated with the portable device ID of portable device 50.

In the embodiment of FIG. 4, the notification server 90 has been informed by the RTL server 80 that there are other portable devices, for example, other two portable devices 50 as illustrated, also being associated with Location C. As discussed above, portable devices 50 may be associated with either persons or apparatuses.

When the notification server 90 receives the new and updated location of the portable device 50 from the RTL server 80, the notification server 90 examines the type of pending notification associated with portable device 50. In this embodiment, for example, a "sensitive" type notification will not be played back at a smart speaker device 40 at the determined location of the portable device 50 if one or more other portable devices 50 associated with a person may be located in the same location as determined by RTL server 80.

For example, if a first portable device 50 is determined to be associated with a medical apparatus, and if no other person associated with a second portable device 50 in Location C, the notification server 90 may send the sensitive-type notification for immediate play back on the smart speaker 40-C. However, if one portable device 50 was associated with a person, then the notification server 90 may cue the notification for subsequent transmission and/or playback at the smart speaker device 40-C in Location C only when no other portable device 50 associated with a person is determined to be in Location C with the portable device 50 determined to receive the sensitive-type notification.

Generally, when the notification server 90 receives the new and updated location of the portable device 50 from the RTL server 80, the notification server 90 examines the type of notification associated with portable device 50. In this embodiment, a "sensitive" type notification will not be played back at a smart speaker device 40 at the determined location of the portable device 50 if any other person having an associated portable device 50 is located in the same determined location.

In another embodiment, the notification may be played back immediately even when another person is detected when the other detected person may be a member of a certain class of personnel, such as medical personnel. For example, the notification server 90 may prevent playback of sensitive information at a smart speaker device when a patient may be present at a determined location but allow playback only if another doctor or medical staff were present at the determined location.

At time T6, portable device 50 exists Location C and at position 404 may be out of communication range of any RF device to communicate with the RTL server 80. Thereafter, notification server 90 sends a signal to the smart speaker device 40-C of the last known location of the portable device 50 to stop any notification being played back associated with portable device 50 and record a timing location of where the notification was stopped or interrupted for playback.

FIG. 4 illustrates Location D having a fourth RF network access point (RF-NAP-D) 60-D in communication 430 with a base station (BS-D) 30-D located in the Location D 4-D. Location D 4-D additionally has a smart speaker device 40-D in communication 436 with the RF-NAP-D 60-D to provide two-way communication with the notification server 90. In an alternative embodiment, smart speaker device 40-D may communication via RF through the base station BS-D, (not shown), to the notification server 90 via the RF-NAP-D 60-D and the backbone network 70.

FIG. 4 further illustrates the portable device 50 at time T7 entering Location D and at or around position 406 the portable device 50 may communicate 432 with BS-D 30-D. Portable device 50 then combines the BS-ID of BS-D 30-D with its own portable device ID and communicates the combined ID information to the RTL server 80 either with the BS-D 30-D 432 or directly 434 to the RF-NAP-D 60-D which then forwards the combined ID information via the backbone network 70 to the RTL server 80.

RTL server 80 determines the received BS-ID of BS-D 30-D being Location D from a predetermined table identifying base stations with their respective locations, and associates portable device ID of portable device 50 with Location D. RTL server 80 forwards the associated portable device ID of portable device 50 with Location D 4-D to the notification server 90 which then determines if there are any pending notifications associated with the portable device ID of portable device 50. When the notification server 90 determines at least one a notification is associated with the identified portable device 50, that notification is then examined to determine what type of a notification it is.

In one embodiment, the notification is determined to be an "announcement" type notification, where the notification controls the presentation of the notification at the smart speaker 40-D to be played back as soon as the RTL server determines the portable device 50 enters a location where another predetermined portable device 50 is co-located and has been set-up by the notification server 90 to receive such announcement-type notifications.

In one embodiment, a patient having a portable device 50 may interact with the smart speaker device 40-D to enable announcement-type notifications to be played back any location where the patient's portable device may be determined to be. For example, when another person with a portable device 50 enters into the Location D at time T7, the RTLN system 1 would enable an announcement-type notification to be generated at the notification server 90 and forwarded for immediate playback at smart speaker 40-D, thereby providing an announcement of the name or title of the person associated with a corresponding portable device that entered Location D.

At time T8, portable device 50 exits Location D and at position 408 may be out of communication range of any RF device to communication with the RTL server 80. Thereafter, notification server 90 may sends a signal to the smart speaker device 40-D of the last known location of the portable device 50 to stop any notifications being played back that are associated with portable device 50 and record a timing location of where the notification was stopped or interrupted for playback.

Figure 5:
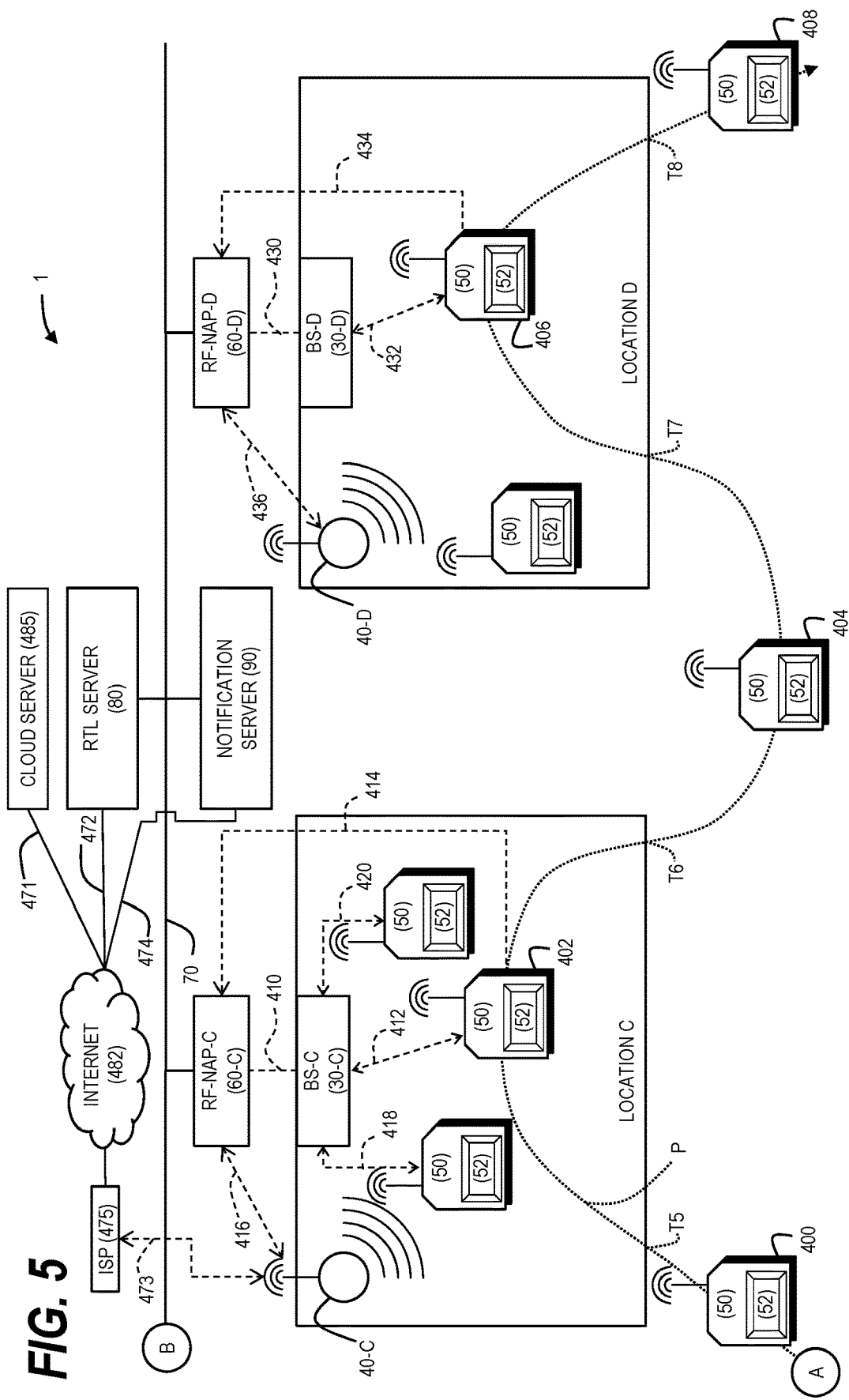
FIG. 5 illustrates an alternate embodiment of the schematic diagram of FIG. 4 of the system for locating and identifying portable devices and presented for playback notifications at a smart speaker device at the located enclosure of the portable device.

FIG. 5 shows an alternative exemplary embodiment of FIG. 4 further including a cloud server 485 connected to the Internet 482 via communication link 471. One or more speakers 40-C (and/or other speakers 40-D) may communicate wirelessly through an Internet Service Provider (ISP) 475 over link 473 with the cloud server 485 as shown.

It is thus contemplated that the instructions to the smart speakers 40 may come from any of the notification server 90, (via backbone network 70 or Internet 482), RTL server 80, (via backbone network 70 or Internet) or cloud server 485 via Internet 482. In addition, the smart speakers 40 may communicate with any of the notification, RTL or cloud servers either directly, over the network 70, or via the Internet 482 as shown.

Thus, for example, the RTL server 80 and/or notification server 90 may send data or commands to the cloud server 485 via the Internet 482, which in turn, may instruct the smart speaker 40, over the connection 471 through the ISP 475 and connection 473, to issue an audible notification at the smart speaker 40.

In the above description of the embodiments, the notification server 90 may determine at least four types of notifications: a general-type notification, a sensitive-type notification, an announcement-type notification and a reminder-type notification. Each of these types of notification will be discussed below in the context of how they are generated, what they are specific to, what triggers the presentation of the notification at a smart speaker device, how they are presented, any how the notification-type may be interacted with by a user triggering the actuation button 52 on the portable device 50.

General-Type Notification

Notifications classified by the notification server 90 as being "general-type" may be generated by the notification system or a user associated with a portable device 50. The user may further generate general-type notifications with platforms other than the notification server 90, for example, web applications, applications resident on personal mobile communication devices, and the like. For these notification server 90 independently generated notifications, the user may need to direct such external notification systems to communicate directly with the notification server 90 via the Internet or any other network communication. General-type notifications may be specific to a particular user or a group of users, and therefore may be associated with a corresponding portable device ID(s) at the RTL server 80 and notification server 90. General-type notifications may be triggered for presentation at a determined smart speaker device 40 based on a determined location of a portable device by the RTL server 80.

The general-type notification may be presented at a smart speaker device 40 by the notification server 90 without exclusion (to another portable device ID), and without respect to time (for example, the reminder-type notification based on scheduled event). The general-type notification may be presented in an ordered list if there are more than one notification to be presented, wherein the ordered list may be prioritized by importance, by age of the notification, i.e., newest to oldest, or by another other sorting routine predetermined or executed by the notification server 90.

The general-type notification may be interacted with by the user of portable device 50 by pressing the activation button 52 to perform the following actions regarding playback of the notifications on a smart speaker device 40: 1) PRESENT playback at the time of actuation of the button 52 rather than automatically by the notification server 90; 2) PAUSE/STOP notification playback; 3) SKIP notification playback and pause/begin playback of subsequent notification; and 4) RESUME notification playback from a previous pause/stop or skip actuation.

In one embodiment, a general-type notification may be provided at a smart speaker 40 after a portable device has already been determined to be in a particular location by the RTL server 80. In this example, if a notification is generated, the notification server 90 determines which portable device is associated with the newly generated notification, and then determines the location of that portable device from information provided by the RTL server 80, after which the notification is immediately transmitted to the smart speaker 40 for playback to the user associated with the portable device 50. An example of this general type notification may be an audio message that states, "The test results are ready," after a laboratory department sends a notice that a particular patient's lab specimen has been processed.

In another embodiment, a general-type notification may be provided at the smart speaker 40 when a portable device enters a room triggering the notification server 90 to determine if there are any notifications associated with that particular location or another person determined by the RTL server 80 to be in that location that the first entering person needs to be aware of. For example, a nurse, upon entering the room of a patient, may have the notification played back stating, "Please check and record vital signs for Mr. Smith."

Sensitive-Type Notification

Notifications classified by the notification server 90 as being "sensitive-type" may be generated by the notification system or a user associated with a portable device 50. The user may further generate sensitive-type notifications with platforms other than the notification server 90, for example, web applications, applications resident on personal mobile communication devices, and the like. For these notification server 90 independently generated notifications, the user may need to direct such external notification systems to communicate directly with the notification server 90 via the Internet or any other network communication. Sensitive-type notifications may be specific to a particular user, and therefore may be associated with a corresponding portable device ID at the RTL server 80 and notification server 90.

In one embodiment, sensitive-type notifications may be cued for presentation at a determined smart speaker device 40 based on a determined location of a portable device by the RTL server 80, where no other portable device 50 (associated with any person) may be located at that determined location. An example of this type of playback might occur when a caretaker enters the room of a patient and a sensitive-type message is cued for playback by the notification server 90 at the smart speaker 40 in the patient's room. However, the notification server 90 will prevent playback at that particular location until either, the patient leaves the room and the caretaker is determined by the RTL server 80 to be alone, or the caretaker leaves the room and enters another room with a smart speaker where the RTL server 80 determines the portable device is alone in that location.

In another embodiment, sensitive-type messages may be presented to a predetermined group portable devices, e.g., medical staff, to the exclusion of patient portable devices 80 for the playback of sensitive-type notifications. For example, a smart speaker device 40 in an employee break room or a nursing post of a hospital may playback notifications determined to be sensitive, whereas the same notifications would not be played back in smart speaker devices any patient rooms or common areas. Hence, whether, and to what extent, the notification is played back may depend upon the location of an asset and the location of the smart speaker, as well as time of day, or other parameters.

In another embodiment, the sensitive-type notification may be presented at a smart speaker device 40 without respect to a particular time (for example, the reminder-type notification based on scheduled event). The sensitive-type notification may be presented in an ordered list if there are more than one notification to be presented, wherein the ordered list may be prioritized by importance, by age of the notification, i.e., newest to oldest, or by another other sorting routine predetermined or executed by the notification server 90.

The sensitive-type notification may be interacted with by the user of portable device 50 by pressing the activation button 52 to perform the following actions regarding playback of the notifications on a smart speaker device 40: 1) PRESENT playback at the time of actuation of the button 52 rather than automatically by the notification server 90; 2) PAUSE/STOP notification playback; 3) SKIP notification playback and pause/begin playback of subsequent notification; and 4) RESUME notification playback from a previous pause/stop or skip actuation.

Announcement-Type Notification

Notifications classified by the notification server 90 as being "announcement-type" may be generated and managed by the notification system. Announcement-type notifications may be specific to one particular user, and therefore may be associated with a corresponding portable device ID at the RTL server 80 and notification server 90. Announcement-type notifications may be triggered for presentation at a determined smart speaker device 40 based on a portable device 50 being configured to receive announcement-type notifications, either at any determined location or a particular determined location, where any other person with a portable device 50 enters the same determined location. Thereafter, the notification server 90 presents the announcement-type notification to be played back at the portable device 50 at that particular determined location.

For example, if a patient having a portable device configures the notification system to receive announcement-type notifications, the notification system 90 may cause the name of each person determined entering the patient's room to be announced on the associated smart speaker 40. The patient may set up this announcement-type notification by interacting with the smart speaker by responding affirmatively to the smart speaker prompt, "Should I announce you have a friend or the name of medical staff when they enter the room?" When the notification server 90 provides any future announcement-type notifications, any portable device 50 associated with someone entering the patient's location would have an audible announcement of their name and/or title played back.

The announcement-type notification may be presented at a smart speaker device 40 by the notification server 90 with regard to any/all recently identified portable device IDs in a location. The announcement-type notification may be presented in a first identified—first announced order.

The announcement-type notification may be interacted with by the user of portable device 50 by pressing the activation button 52 of any portable device 50 in the determined location to perform the following actions regarding playback of the notifications on a smart speaker device 40: 1) PAUSE/STOP notification playback; 2) SKIP notification playback and pause/begin playback of subsequent notification(s) if more than one announcement-type notification exists; and 3) RESUME notification playback from a previous pause/stop or skip actuation.

Reminder-Type Notification

Notifications classified by the notification server 90 as being "reminder-type" may be generated by the notification system or a user associated with a portable device 50. The user may further generate reminder-type notifications with platforms other than the notification server 90, for example, web applications, applications resident on personal mobile communication devices, and the like. For these notification server 90 independently generated notifications, the user may need to direct such external notification systems to communicate directly with the notification server 90 via the Internet or any other network communication. Reminder-type notifications may be specific to one particular user, and therefore may be associated with a corresponding portable device ID at the RTL server 80 and notification server 90.

In one embodiment, a patient may have reminder-type notification presented at the smart speaker device 40 when a particular calendared event comes due for presentation via the notification server 90. For example, if a patient is to be provided reminder-type notification 15 minutes before an appointment for an X-ray at the radiology lab, the notification would be played back via a smart speaker at a location determined by RTL server 80 where the patient's portable device is located.

In another embodiment, reminder-type notifications may also be specific to more than one particular user, and therefore may be associated with corresponding portable device IDs at the RTL server 80 and notification server 90 for a scheduled event where more than one person is associated with that particular event. For example, if a nurse administered medication for a patent is scheduled for a particular time of the day, both the patient and nurse portable devices 50 may be triggered to receive a reminder-type announcement, e.g., a nurse at a smart speaker device in their nursing station location, and the patient at a smart speaker device in their hospital room.

The reminder-type notification may be presented at a smart speaker device 40 by the notification server 90 with regard to either a scheduled (or calendared) event in the notification server 90, or a scheduled event that corresponds to a particular location, (e.g., the above provided example where a patient is notified to take a medication that needs to be taken with food when the patient is determined to be entering a location where food is eaten). Alternatively, the reminder-type notification may be presented based generally on a calendar day with no specific time or based on a particular time within a day.

The reminder-type notification may be interacted with by the user of portable device 50 by pressing the activation button 52 of any portable device 50 in the determined location to perform the following actions regarding playback of the notifications on a smart speaker device 40: 1) PRESENT playback at the time of actuation of the button 52 rather than automatically by the notification server 90, (this actuation may cause a person to manually trigger the reminder-type notification without having the base station 6 poll the location with a beacon looking for any new portable devices 8); 2) PAUSE/STOP notification playback; 3) SKIP notification playback and pause/begin playback of subsequent notification(s) if more than one reminder-type notification exists; and 4) RESUME notification playback from a previous pause/stop or skip actuation.

In another embodiment, the notification server 90 may prevent playback of all or certain types of notifications during certain periods of a day. For example, all notifications for a particular portable device may be cued for playback but paused for playback between certain hours where the patient is sleeping. The patient may initiate the suspension of playback of all messages for a particular time period in a particular location via interaction with the smart speaker device by stating, "Please stop all notifications between the hours of 9:00 PM and 8:00 AM." In another embodiment, the patient may exclude a particular notification within the exclusion period by stating, "Please notify me when breakfast is being served."

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A system for presenting a notification for playback at a smart speaker device, the system comprising:
   a real-time location (RTL) server configured to communicate with a backbone network;
   a base station configured to transmit a signal including an identifier of the base station to a portable device, the portable device configured to transmit an output signal including a portable device ID representative of the portable device to at least one radio frequency network access point (RF-NAP);
      wherein the output signal of the portable device includes the identifier of the base station combined with the portable device ID, defining a combined ID signal; and
      wherein the at least one RF-NAP communicates via the backbone network to the RTL server and a notification server;
   the notification server configured to associate the notification with the portable device ID, and at least one of generate, store, distribute, cue and present for playback the notification based on the portable device ID; and
   a smart speaker device configured to communicate with the base station and the RF-NAP to receive communication from the notification server, the smart speaker device is associated with a location,
   wherein the RTL server is configured to determine the location and an identity of the portable device based on receiving the combined ID signal from the portable device, and
   wherein the notification server is configured to cue the associated notification for playback at the smart speaker device based on the determined location of the portable device.

2. The system according to claim 1, wherein the notification comprises a general-type notification configured to present for playback on the smart speaker device at the RTL server-determined location of the portable device when the general-type notification is one of generated or the location of the portable device is determined to be coincident with the location of the smart speaker device.

3. The system according to claim 1, wherein the notification comprises a sensitive-type notification configured to present for playback on the smart speaker device at the RTL server-determined location of the portable device only when no other portable device is determined to be at the associated location of the smart speaker device.

4. The system according to claim 1, wherein the notification comprises an announcement-type notification configured to present for playback on the smart speaker device at the RTL server-determined location of the portable device when a second portable device is determined to enter the same RTL server-determined location as the portable device.

5. The system according to claim 1, wherein the notification comprises a reminder-type notification configured to present for playback on the smart speaker device at the RTL server-determined location of the portable device when one of
   the notification server determines the reminder-type notification is associated with a particular scheduled event associated with the portable device, or
   the RTL server-determined location of the portable device is coincident with a predetermined location associated with the particular scheduled event.

6. The system according to claim 1, wherein the portable device further comprises an actuation trigger configured to, when activated by a user, cause the notification server to identify the portable device to the RTL server and present the notification at the smart speaker device proximate the notification playback location.

7. The system according to claim 1, wherein the portable device further comprises an actuation trigger configured to, when activated by a user, cause the notification server to identify the portable device to the RTL server and pause or stop playback of the notification at the smart speaker device proximate the notification playback location.

8. The system according to claim 1, wherein the portable device further comprises an actuation trigger configured to, when activated by a user, cause the notification server to identify the portable device to the RTL server and skip playback of the notification at the smart speaker device proximate the notification playback location.

9. The system according to claim 1, wherein the portable device further comprises an actuation trigger configured to, when activated by a user, cause the notification server to identify the portable device to the RTL server and resume playback of the notification at the smart speaker device proximate the notification playback location.

10. A method for transmitting a notification to a smart speaker device based on identifying a portable device ID and a portable device location of a portable device, the method comprising:
   determining, at a real-time location (RTL) server, a location and an identity of the portable device based on receiving an output signal from the portable device at the RTL server, wherein:
      (a) the output signal of the portable device includes a signal from a base station including an identifier of the base station combined with the portable device ID, defining a combined ID signal;
      (b) the RTL is configured to communicate with a backbone network;
      (c) the portable device transmits the output signal to at least one radio frequency network access port (RF-NAP), and wherein the at least one RF-NAP communicates via the backbone network to the RTL server and a notification server;
   associating, at the notification server, a notification corresponding to the portable device based on the determined identity of the portable device;
   determining, at the notification server, a notification playback location corresponding to the determined location of the portable device; and
   cueing for playback the associated notification at the smart speaker device proximate the notification playback location.

11. The method according to claim 10, further comprising:
receiving, at the notification server, a second notification after the RTL server has determined the location and identify of the portable device;
associating the second notification corresponding to the portable device based on the determined identity of the portable device; and
cueing for playback the corresponding second notification at the smart speaker device proximate the determined location of the portable device.

12. The method according to claim 10, further comprising:
determining, at the real-time location (RTL) server, no output signal being received from the portable device; and
suspending playback of the associated notification at the smart speaker device proximate the notification playback location.

13. The method according to claim 12, further comprising:
transmitting, at the portable device, a second output signal including the portable device ID representative of the portable device;
determining, at the real-time location (RTL) server, a second location and the identity of the portable device based on receiving the second output signal from the portable device;
determining, at the notification server, a second notification playback location corresponding to the determined second location of the portable device; and
cueing for playback the associated notification at a second smart speaker device proximate the second notification playback location.

14. The method according to claim 10, further comprising:
determining, at the notification server, that the notification is designated for immediate playback on the smart speaker device proximate the notification playback location;
playing back the notification at the smart speaker device proximate the notification playback location; and
actuating a trigger on the portable device to cause the notification server to at least one of
pause or to stop playback of the notification at the smart speaker device proximate the notification playback location,
skip playback of the notification at the smart speaker device proximate the notification playback location, or
resume playback of the notification at the smart speaker device proximate the notification playback location.

15. The method according to claim 10, further comprising determining, at the notification server, the notification is designated for immediate playback on the smart speaker device proximate the notification playback location when the notification is associated with a scheduled event associated with the portable device.

16. The method according to claim 10, further comprising determining, at the notification server, the notification is designated for immediate playback on the smart speaker device when the RTL server-determined location of the portable device is coincident with a predetermined location associated with a particular scheduled event.

17. A method for transmitting a notification to a smart speaker device based on identifying a portable device ID and a portable device location of a portable device, the method comprising:
determining, at a real-time location (RTL) server, a location and an identity of each of a plurality of portable devices based on receiving output signals from the plurality of portable devices, wherein:
(a) the output signal of the each portable device includes a signal from a base station including an identifier of the base station combined with the portable device ID, defining a combined ID signal;
(b) the RTL is configured to communicate with a backbone network;
(c) each portable device transmits the output signal, respectively, to at least one radio frequency network access port (RF-NAP), and wherein the at least one RF-NAP communicates via the backbone network to the RTL server and a notification server;
associating, at the notification server, a notification corresponding to at least one of the plurality of portable devices based on the determined identity of the at least one of the plurality of portable devices;
determining, at the notification server, a notification playback location corresponding to the determined location of the plurality of portable devices; and
cueing for playback the associated notification at the smart speaker device proximate the determined notification playback location.

18. The method according to claim 17, further comprising:
receiving, at the notification server, a second notification after the RTL server has determined the location and identity of each of the plurality of portable devices;
associating the second notification corresponding to the at least one of the plurality of portable devices based on the determined identity of each of the plurality of portable devices; and
cueing for playback the corresponding second notification at the smart speaker device proximate the determined notification playback location.

19. The method according to claim 17, further comprising:
determining, at the real-time location (RTL) server, no output signal being received from the at least one of the plurality of portable devices; and
suspending playback of the associated notification at the smart speaker device proximate the determined notification playback location.

20. The method according to claim 19, further comprising:
transmitting, from one of the plurality of portable devices, a second output signal including the portable device ID representative of the one of the plurality of portable devices;
determining, at the real-time location (RTL) server, a second location and the identity of the one of the plurality of portable devices based on receiving the second output signal from the one of the plurality of portable devices;
determining, at the notification server, a second notification playback location corresponding to the determined second location of the one of the plurality of portable devices; and
cueing for playback the associated notification at a second smart speaker device proximate the determined second notification playback location.

21. The method according to claim 17, further comprising:
determining, at the notification server, that the notification is designated for playback on the smart speaker device proximate the notification playback location only when no other portable devices other than the at least one of the plurality of portable devices is proximate the notification playback location; and one of pausing or stopping playback of the corresponding notification at the smart speaker device proximate the notification playback location based on determining the at least one of the plurality of portable devices being proximate another of the plurality of portable devices based on the determined location of the at least one of the plurality of portable devices.

22. The method according to claim 17, further comprising:

determining, at the notification server, that the notification is designated for playback on the smart speaker device proximate the notification playback location when another of the plurality other portable devices other than the at least one of the plurality of portable devices is proximate the notification playback location; and presenting playback of the corresponding notification at the smart speaker device proximate the notification playback location based on determining the at least one of the plurality of portable devices being proximate the another of the plurality of portable devices based on the determined location of the at least one of the plurality of portable devices.

23. The method according to claim 17, further comprising:

determining, at the notification server, that the notification is designated for playback on the smart speaker device proximate the notification playback location when another of the plurality other portable devices in addition to the at least one of the plurality of portable devices is proximate the notification playback location, and when the notification is associated with a scheduled event associated with the one of the portable devices; and presenting playback of the corresponding notification at the smart speaker device proximate the notification playback location based on determining the at least one of the plurality of portable devices being proximate the another of the plurality of portable devices based on the determined location of the at least one of the plurality of portable devices and the notification is associated with the scheduled event associated with the at least one of the plurality of portable devices.

24. The smart speaker according to claim 1, wherein the smart speaker communicates with the radio frequency network access point (RF-NAP) to provide communication with the notification server.

25. A system for presenting a notification for playback at a smart speaker device, the system comprising:

a real-time location (RTL) server configured to communicate with a backbone network;

a first base station configured to transmit a first signal including an identifier of the first base station;

a portable device configured to:

(a) receive the first signal, (b) generate a second signal that includes the identifier of the first base station and a device ID of the portable device, and (c) transmit the second signal;

a second base station configured to receive the second signal and transmit the second signal to the RTL server;

a notification server, wherein the notification server is configured to communicate with the backbone network, and configured to associate the notification with the portable device ID, and configured to at least one of generate, store, distribute, cue and present for playback the notification based on the portable device ID; and a smart speaker device configured to receive communication originating from the notification server, wherein the smart speaker device is associated with a location, wherein the RTL server is configured to determine the location and an identity of the portable device, and wherein the notification server is configured to cue the associated notification for playback at the smart speaker device based on the determined location of the portable device.

* * * * *